United States Patent [19]

Furuta

[11] Patent Number: 5,756,988
[45] Date of Patent: May 26, 1998

[54] DEVICE FOR CHECKING LATERAL VIEWS AT FRONT/REAR ENDS OF VEHICLE

[76] Inventor: Yoshihisa Furuta, 3-8 Nakajima 1-chome, Hamamatsu-shi, Shizuoka-ken, Japan

[21] Appl. No.: 670,443

[22] Filed: Jun. 26, 1996

[30] Foreign Application Priority Data

Jun. 27, 1995 [JP] Japan .................................. 7-183522

[51] Int. Cl.⁶ ...................................................... H01J 40/14
[52] U.S. Cl. .......................... 250/208.1; 250/216; 348/116
[58] Field of Search ................................ 250/216, 208.1, 250/203.6, 239; 359/726–731, 737–738; 340/937–939, 990, 995, 996; 364/423.098, 424.018, 424.019; 348/116–120, 153–156

[56] References Cited

U.S. PATENT DOCUMENTS

3,972,596  8/1976  Baumgardner et al. .................. 359/737
4,900,140  2/1990  Okamura .................................... 359/726
5,642,106  6/1997  Hancock et al. ........................ 250/203.6

Primary Examiner—Que Le
Attorney, Agent, or Firm—Varndell Legal Group

[57] ABSTRACT

A device for checking lateral views at front/rear ends of a vehicle comprises an image pickup unit having a light path altering assembly and an image sensor and disposed at a front or rear end of a vehicle, for taking into the image sensor image information of areas on the right and left of the vehicle by way of the light path altering assembly and image information of an area ahead of the image sensor through a gap formed along an extension of an axial line of the image sensor; and a display unit provided in a room of the vehicle, for displaying the image information taken into the image sensor.

14 Claims, 9 Drawing Sheets

DEVICE FOR CHECKING LATERAL VIEWS AT FRONT/REAR ENDS OF VEHICLE

FIELD OF THE INVENTION

The present invention relates to devices for checking lateral views at front/rear ends of a vehicle and more particularly to devices for checking the lateral views at the front end of a vehicle as well as front view or for checking the lateral views at the rear end of a vehicle as well as rear view.

DESCRIPTION OF THE RELATED ART

On an occasion where a car is driven to enter a street from a carport of a house, or on an occasion where a car is driven to enter a main street from an alley or similar occasions, a driver of the car cannot see the traffic situations of the street until the driver's seat of the car reaches the edge of the street. Therefore, on such occasions, the driver must drive a car slowly so as to let the car enter the street smoothly without interrupting the traffic of the street. This takes time and labor.

Meanwhile, a driver sitting on the driver's seat cannot see the neighboring areas of the front and rear ends of the car. Therefore, before starting a car, the driver must check the situation of these areas. This check is conducted on the spot by the driver before he or she takes the driver's seat. After having taken the seat, the driver cannot check the situations of these areas. Therefore, the driver feels uneasy when starting the car.

SUMMARY OF THE INVENTION

Accordingly, an object of the present invention is to provide a device for checking lateral views at the front/rear ends of a vehicle capable of easily checking the situations of the areas on the right and left viewed from the front or rear end of the vehicle as well as the situations of the areas which cannot be seen from the driver seated on the driver's seat.

The device for checking lateral views at the front/rear ends of a vehicle of the present invention comprises an image pickup unit having a light path altering assembly and an image sensor and disposed at the front or rear end of the vehicle, for taking into the image sensor image information of areas on the right and left of the vehicle by way of the light path altering assembly and image information of an area ahead of the image sensor through a gap formed along an extension of an axial line of the image sensor; and a display unit provided in a room of the vehicle, for displaying the image information taken into the image sensor.

The gap may be a hole formed in the light path altering assembly which is disposed in front of the image sensor or a gap between two portions of the light path altering assembly if the light path altering assembly is divided into the two portions.

The image information of the areas on the right and left of the vehicle enters the image sensor by way of the light path altering assembly, while the image information of the area ahead of the vehicle directly enters the image sensor through the gap. Therefore, the quantity of light entering the image sensor for the image information of the area ahead of the vehicle is greater than that for the image information of the areas on the right and left of the vehicle. To compensate for the difference in the quantity of light, a filter is provided on the line connecting the image sensor and the gap or the extension thereof. With this filter, the quantity of light entering the image sensor through the gap is reduced to be about the same as that entering the image sensor by way of the light path altering assembly. Thus, the image information for each area is displayed on the screen of the display unit with about the same light intensity.

The light path altering assembly is provided to obtain the image information for two areas in the lateral directions (right and left) with respect to the running direction of the vehicle. The light path altering assembly may be constructed by mirrors, prisms or optical fiber.

When one mirror (one pair of mirrors) is employed in the light path altering assembly, the reflective surface of each of the pair of mirrors is disposed on the right or left side of a vertical plane containing the axial line of the image sensor so as to have an angle of about 135 degrees relative to the vertical plane. When the image information for the areas on the right and left of the vehicle is led into the image sensor by the one mirror (one pair of mirrors), reversed image is displayed on the display unit. This is satisfactory for merely checking the presence or absence of cars or human. However, the driver has to be accustomed to the reversed image to check the detailed situations on the right and left of the vehicle.

For easy check of the situations on the right and left of the vehicle, the light path altering assembly employs two mirrors, in which the first mirror receives the image information on the right and left of the vehicle, and the second mirror reverses the image information received by the first mirror. Thus, the image sensor receives the image information in normal position which in turn is displayed on the display unit.

In the light path altering assembly where two mirrors are employed, the reflective surface of each of the pair of the first mirrors is disposed on the right or left side a vertical plane containing the axial line of the image sensor so as to have an angle of 115–135 degrees relative to the vertical plane, and the reflective surface of the second mirrors is disposed on the right or left side of the vertical plane so as to have an angle of 90 degrees relative to the vertical plane.

In a light path altering assembly so configured that the second mirror is disposed in front of the image sensor, the first mirror serves as an obstacle for the image information reflected at the second mirror as well as for the image information for the area ahead of the image sensor to enter the image sensor. In the light path altering assembly of this configuration, portions of the first mirror corresponding to the path along which the image information enters have to be removed. However, by employing the first mirror made of a semi-transparent mirror, such removal is not necessary.

The mirror may be made of glass. Alternatively, it may be made of aluminum or stainless steel with one surface thereof being mirror finished. Tape may be attached or line may be printed on the mirror at the border of each of the image information received so that the boundaries thereof are made clearer. For the image sensor, the charge coupled device is preferably employed. For the display unit, CRT or liquid crystal is employed. If the vehicle is provided with a navigation system or TV set, the display of the navigation system or TV set can be used for the display of the device for checking lateral views at the front/rear ends of a vehicle. Electric power for the image sensor and display unit may be supplied from a battery for the vehicle.

When the image pickup unit is mounted at the front end of the vehicle, situations of the areas not only the lateral directions but also a visually dead angle area ahead of the vehicle that cannot be seen from the driver's seat can be checked from the driver's seat, whereby the safety check especially at the start of the running can be made easily. When the image pickup unit is mounted at the rear end of the vehicle, situations of the areas not only the lateral directions but also a visually dead angle area backward of the vehicle that cannot be seen from the driver's seat can be checked from the driver's seat.

When a left steering wheel vehicle (i.e., a vehicle in which the steering wheel is located at left side) tries to pass another car ahead while running in a country in a keep-to-the-left traffic system, checking the situations ahead of the vehicle becomes easy by disposing the image pickup unit at the front right corner of the vehicle. On the other hand, when a right steering wheel vehicle (i.e., a vehicle in which the steering wheel is located at right side) tries to pass another car ahead while running in a country in a keep-to-the-right traffic system, checking the situations ahead of the vehicle becomes easy by disposing the image pickup unit at the front left corner of the vehicle.

In order to check not only the situations in the lateral directions of the vehicle and the situation ahead of the image sensor, but also the situation backward of the image sensor, a mirror provided in front of the image sensor is arranged such as to be slightly inclined upward or downward. With this arrangement of the mirror, the image sensor can receive the image information backward of the image sensor by way of the mirror. In this case, a portion of the mirror, which is an obstacle to receive the image information backward of the image sensor, must be removed. For example, for the light path altering assembly having the first and second mirrors, when a portion of the first mirror is an obstacle, this portion must be removed or a hole must be formed in this portion.

For example, in driving a left steering wheel vehicle in a country where a keep-to-the-left traffic system is adopted, disposing of the image pickup unit of the above type at the right rear corner of the vehicle enables to check from the driver's seat the situations on the right and left of the vehicle while driving the vehicle in the backward direction to get it out from the carport, the situation of the area ahead of the vehicle while passing another car ahead, and the situation of the visually dead angle area back of the vehicle which cannot be seen from the driver's seat.

For a large-sized right steering wheel vehicle running in a country of keep-to-left traffic system, disposing of the image pickup unit at the left rear corner of the vehicle enables to check the situation of the area in the vicinity of the rear wheels and the visually dead angle areas which cannot be seen from the driver's seat.

In driving a right steering wheel vehicle in a country where a keep-to-the-right traffic system is adopted, disposing of the image pickup unit at the left rear corner of the vehicle enables to check from the driver's seat the situations on the right and left of the vehicle while driving the vehicle in the backward direction to get it out from the carport, the situation of the area ahead of the vehicle while passing another car ahead, and the situation of the visually dead angle area back of the vehicle which cannot be seen from the driver's seat.

For a large-sized left steering wheel vehicle running in a country of keep-to-right traffic system, disposing of the image pickup unit at the right rear corner of the vehicle enables to check from the driver's seat the situation of the area in the vicinity of the rear wheels and the visually dead angle areas which cannot be seen from the driver's seat.

DETAILED DESCRIPTION OF THE EMBODIMENTS

The embodiments of a device for checking lateral views at front/rear ends of a vehicle according to the present invention are now described while referring to the accompanying drawings.

Figure 2:
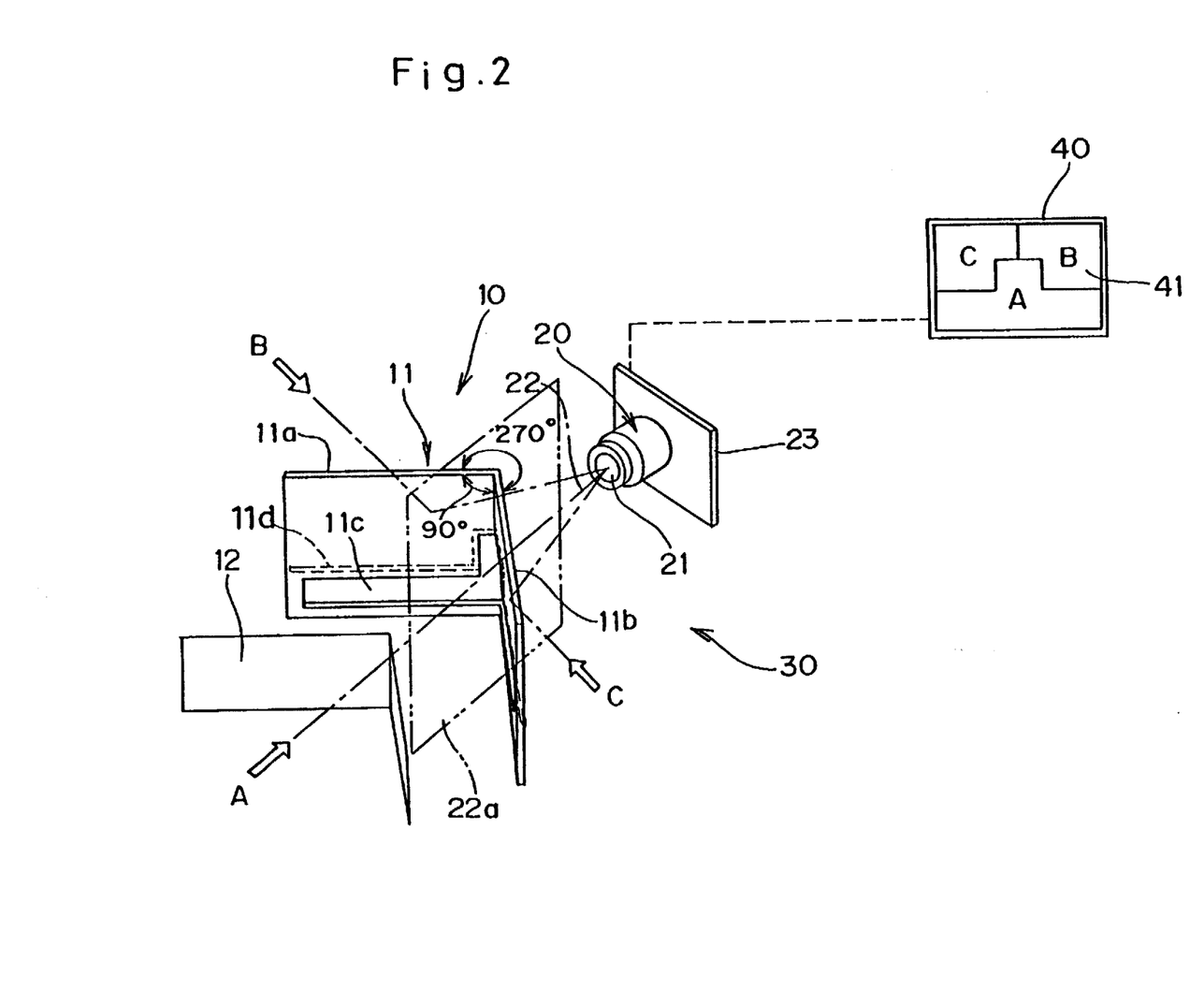
FIG. 2 is a view illustrating the function of an embodiment of the device for checking lateral views at the front/rear ends of a vehicle according to the present invention.

Referring first to FIG. 2, a device for checking lateral views at front/rear ends of a vehicle according to an embodiment of the present invention comprises an image pickup unit 30 which includes a light path altering assembly 10 and an image sensor 20 and a display unit 40 for displaying the image picked up by the image sensor 20.

Figure 1:
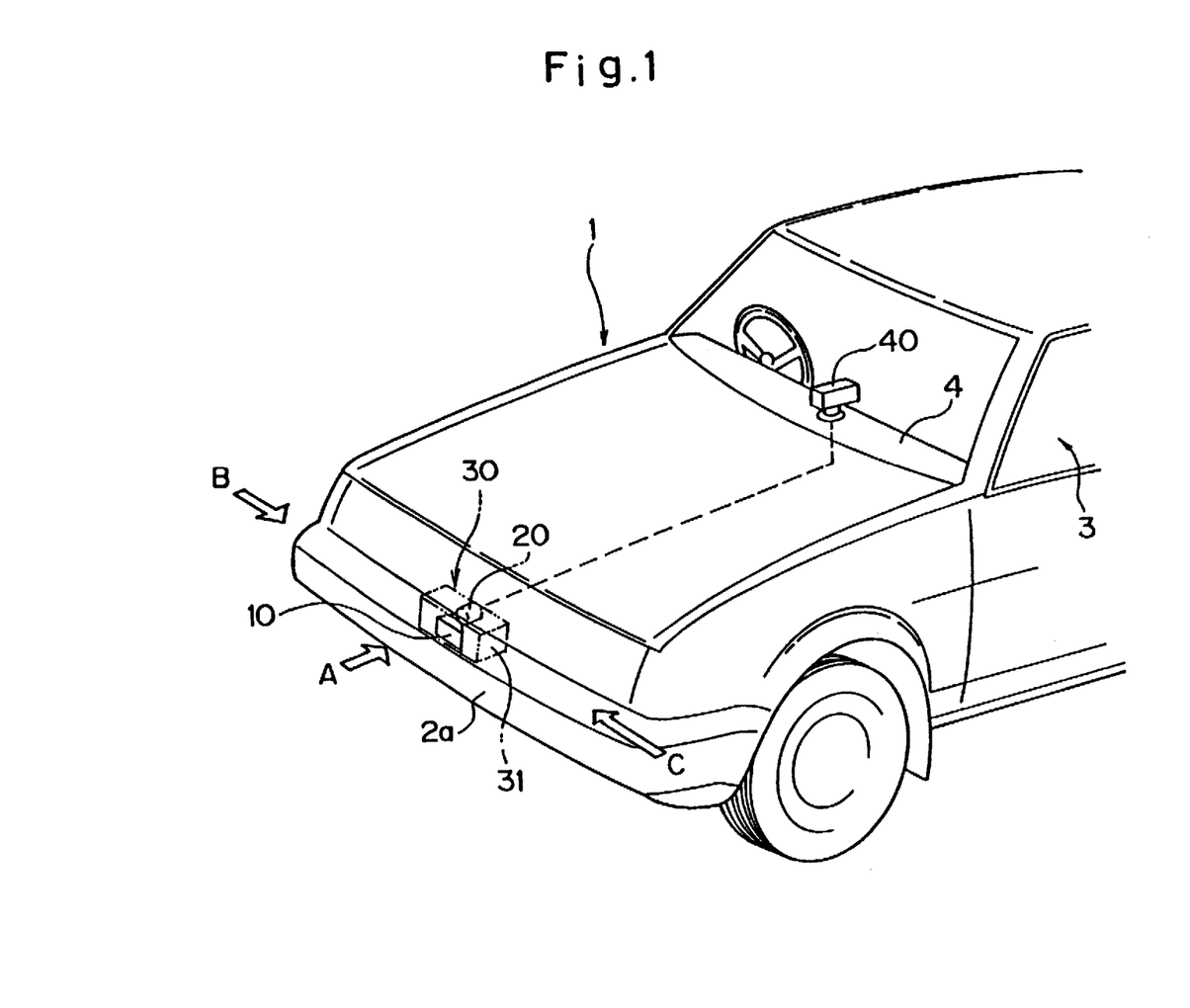
FIG. 1 is a schematic perspective view of the front half of a vehicle where the device for checking lateral views at the front/rear ends of a vehicle according to the present invention is mounted.

The image pickup unit 30 is disposed at the front end portion or the rear end portion of a vehicle. For example, as shown in FIG. 1, the image pickup unit 30 is disposed on a front bumper 2a of a vehicle 1. The display unit 40 is disposed at an appropriate place in a room 3 of the vehicle 1. For example, as shown in FIG. 1, the display unit 40 is disposed on an instrument panel 4. The light path altering assembly 10 and the image sensor 20 are housed in a transparent housing 31 which is made of plastics.

Referring back to FIG. 2, the light path altering assembly 10 comprises a mirror 11 which is made of a stainless steel plate with one face thereof being mirror finished to form reflective surface. The mirror 11 is so configured that the stainless steel plate is folded into two portions such that the folded two portions form therebetween an angle of about 90 degrees with reflective surfaces 11a and 11b being outside (angle between the reflective surfaces 11a and 11b is about 270 degrees). The lower center portion of the mirror 11 is formed with a convex-shaped aperture 11c. Tape 11d is attached at the upper edge of the aperture 11c on the side of the reflective surfaces 11a and 11b so as to make clear the boundaries of each of the image information. Further, a filter 12 for reducing the quantity of light is provided to cover the aperture 11c.

The mirror 11 is disposed such that each of the reflective surfaces 11a and 11b forms an angle of 135 degrees relative to a vertical plane 22a which contains an axial line 22 of the image sensor 20. Reference numeral 23 represents a circuit board of the image sensor 20.

In the device for checking lateral views at the front/rear ends of a vehicle so configured as described above, image information A for the area ahead of the vehicle 1 enters a lens 21 of the image sensor 20 by way of the filter 12 and the aperture 11c, image information B for the area on the right of the vehicle 1 is reflected at the reflective surface 11a of the mirror 11 and then enters the lens 21 of the image sensor 20, and image information C for the area on the left of the vehicle 1 is reflected at the reflective surface 11b of the mirror 11 and then enters the lens 21 of the image sensor 20. The quantity of light for the image information A entering the lens 21 is reduced by the filter 12 so that it is about the same quantity of light for the image information B and C entering the lens 21 by way of the mirror 11. Each of the image information A, B, C enters corresponding divided zone of the lens 21 of the image sensor 20, is converted to electric signals by a circuit on the circuit board 23 and is displayed on the corresponding divided zone of the screen 41 of the display unit 40.

Figure 3:
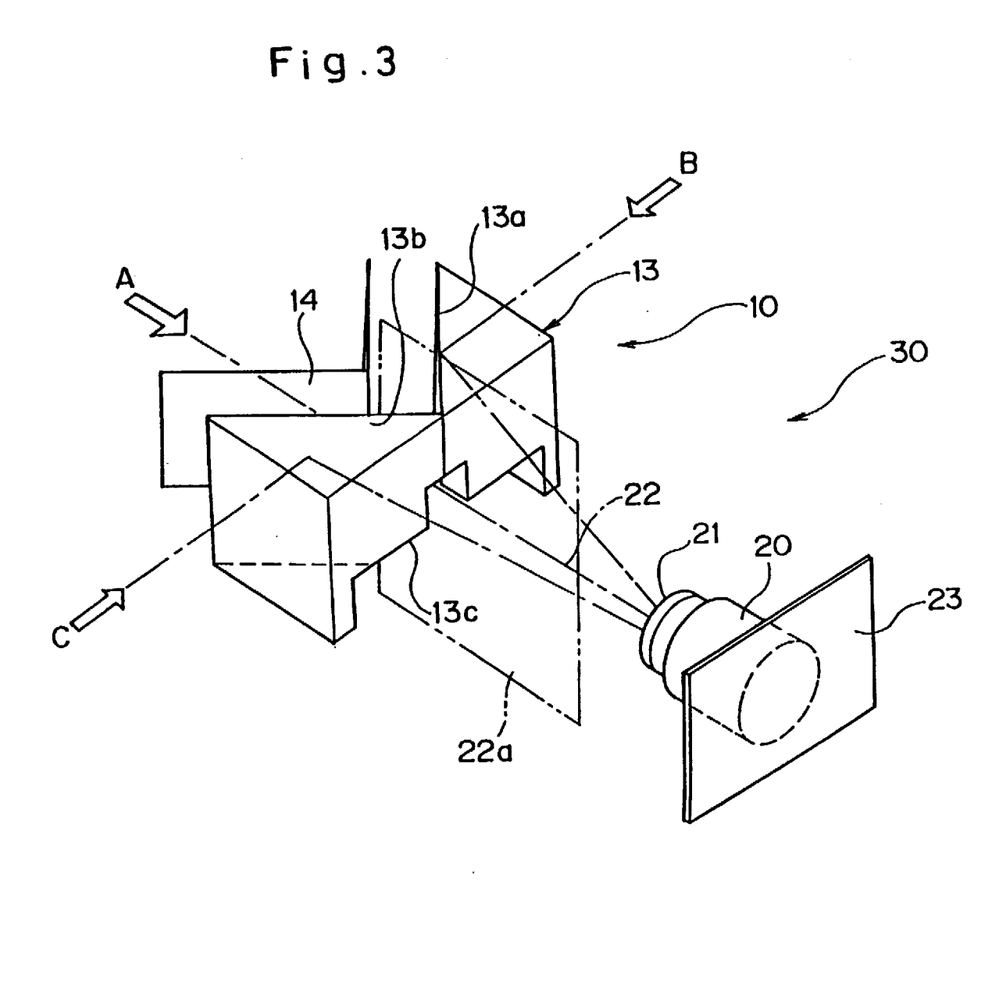
FIG. 3 is a view illustrating another embodiment of the device for checking lateral views at the front/rear ends of a vehicle in which only an image pickup unit is shown.

FIG. 3 illustrates another embodiment of the image pickup unit 30 in which a rectangular prism 13 is employed as the light path altering assembly 10. The prism 13 is disposed such that each of the reflective surfaces 13a and 13b forms an angle of 135 degrees relative to the vertical plane 22a which contains the axial line 22 of the image sensor 20. A portion 13c of the prism 13 corresponding to the extension of the axial line 22 of the image sensor 20 is removed. A filter 14 is provided for the removed portion 13c.

In the image pickup unit 30 so configured as described above, similar to the first mentioned embodiment, image information A for the area ahead of the vehicle 1 enters a lens 21 of the image sensor 20 by way of the filter 14 and the removed portion 13c, image information B for the area on the right of the vehicle 1 is reflected at the reflective surface 13a of the prism 13 and then enters the lens 21 of the image sensor 20, and image information C for the area on the left of the vehicle 1 is reflected at the reflective surface 13b of the prism 13 and then enters the lens 21 of the image sensor 20. The quantity of light for the image information A entering the lens 21 is reduced by the filter 14 so that it is about the same quantity of light for the image information B and C entering the lens 21 by way of the prism 13. Each of the image information A, B, C enters corresponding divided zone of the lens 21 of the image sensor 20, is converted to electric signals by a circuit on the circuit board 23 and is displayed on the corresponding divided zone of the screen 41 of the display unit 40.

Figure 4:
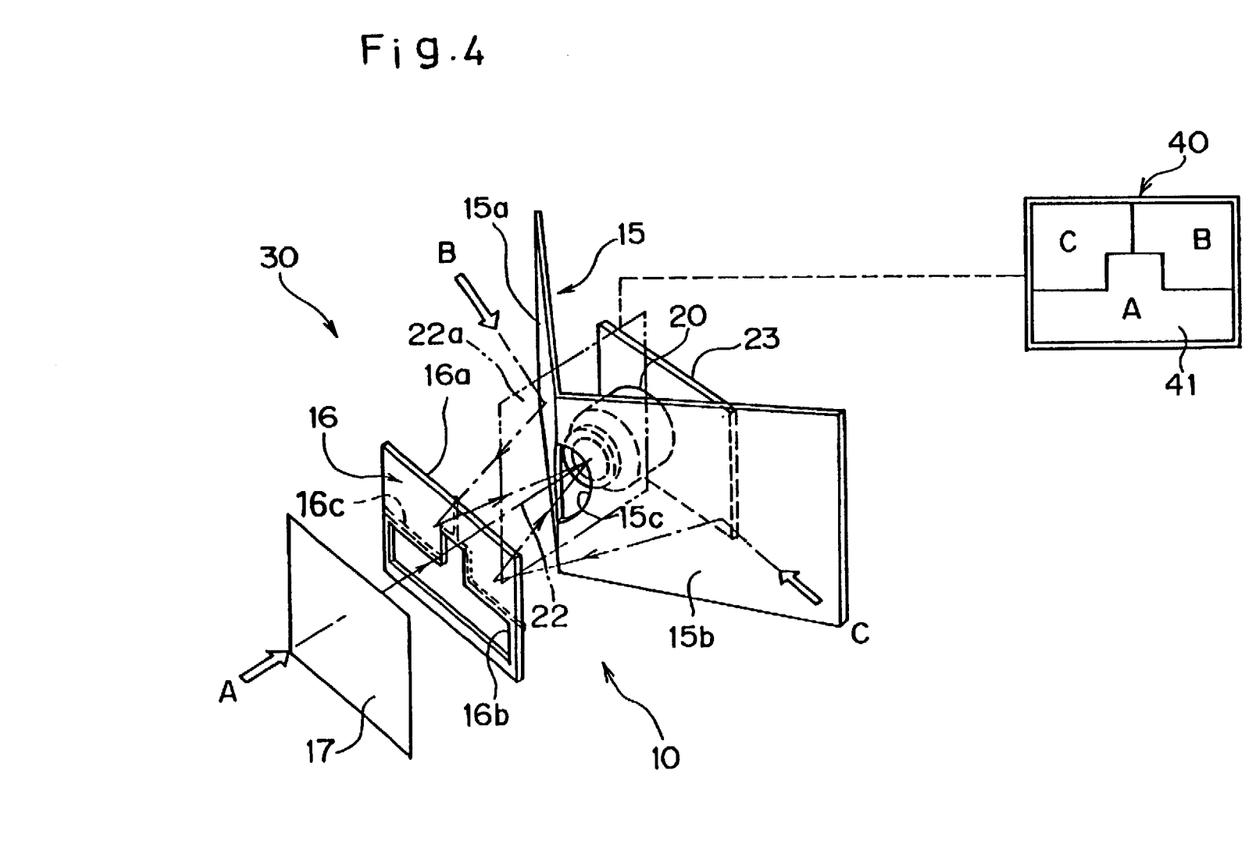
FIG. 4 is a view illustrating still another embodiment of the device for checking lateral views at the front/rear ends of a vehicle.

FIG. 4 illustrates a device for checking lateral views at front/rear ends of a vehicle according to still another embodiment of the present invention in which the light path altering assembly 10 comprises a first mirror 15 and a second mirror 16. The first mirror 15 is made of a stainless steel plate with one face thereof being mirror finished to form a reflective surface, and is so configured that the stainless steel plate is folded into two portions such that the folded two portions form therebetween an angle of 90–130 degrees with reflective surfaces 15a and 15b being outside (angle between the reflective surfaces 15a and 15b is 270–230 degrees). The second mirror 16 is also made of a stainless steel plate with one face thereof being mirror finished to form a reflective surface 16a. The first mirror 15 is formed with a circular aperture 15c at a jointing portion of the reflective surfaces 15a and 15b, and the second mirror 16 is formed with a convex-shaped aperture 16b at the lower center portion thereof. Tape 16c is attached at the upper edge of the aperture 16b and from the center of the upper edge of the aperture 16b to the center of the upper edge of the mirror 16 on the reflective surfaces 16a of the second mirror 16 in order to distinguish the borders of the image information.

Figure 5A:
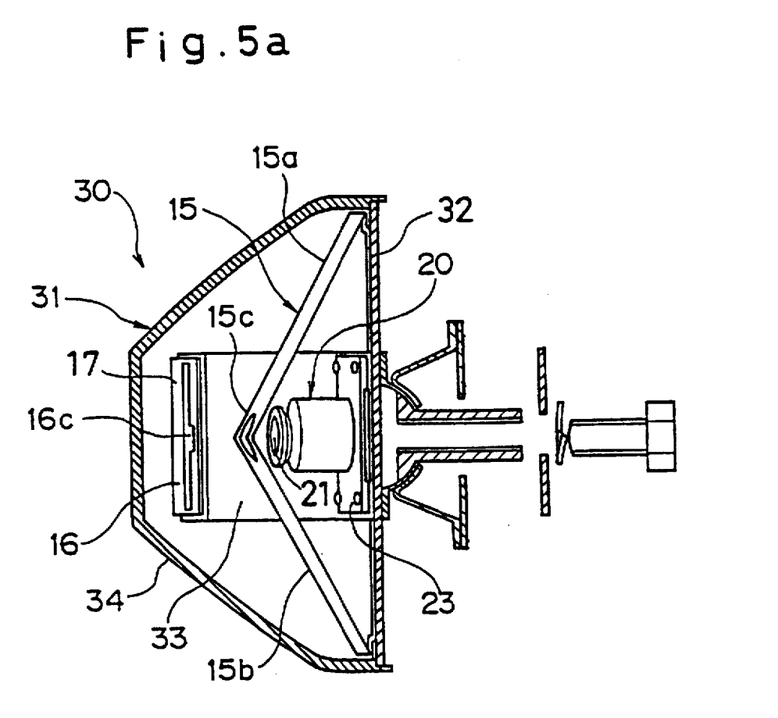
FIGS. 5(a) and 5(b) are sectional views illustrating the mounting arrangement of the image pickup unit of FIG. 4.

Referring to FIG. 5(a), the first mirror 15 is disposed on a mounting base 32 of a housing 31 such that it covers the image sensor 20 with the back face thereof and each of the reflective surfaces 15a and 15b forms an angle of 115–135 degrees relative to a vertical plane 22a which contains an axial line 22 of the image sensor 20. The second mirror 16 is disposed on a mounting frame 33 of the housing 31 such that the reflective surface 16a thereof is opposed to the reflective surfaces 15a and 15b of the first mirror 15. Having been arranged in the above-described manner, the first mirror 15 and the second mirror 16 are so disposed that the aperture 15c of the first mirror 15 and the aperture 16b of the second mirror 16 are positioned on the axial line 22 of the lens 21. A filter 17 is provided for the aperture 16b of the second mirror 16 for reducing the quantity of lights. A circuit board 23 for operating the image sensor 20 is mounted on a mounting base 32 of the housing 31.

Figure 5B:
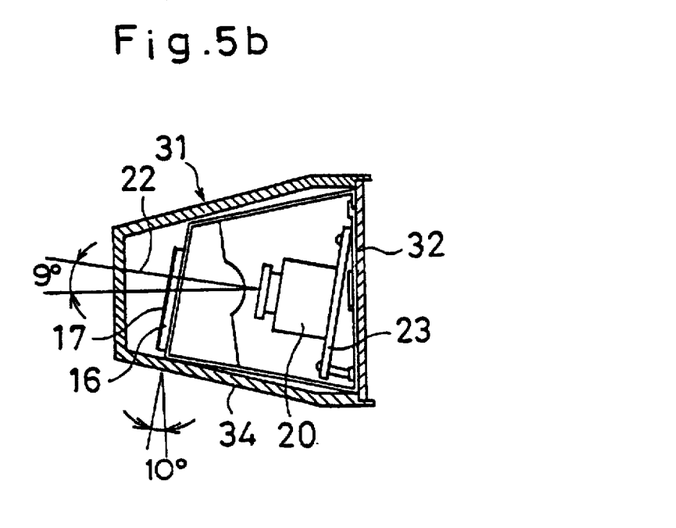

The first mirror 15, the second mirror 16 and the image sensor 20 are covered with a transparent plastic cover 34. As shown in FIG. 5(b), the housing 31 is mounted on the vehicle 1 such that the axial line 22 of the image sensor 20 inclines upward with respect to a level plane by about 9 degrees.

In the device for checking lateral views at the front/rear ends of a vehicle so configured as described above, as shown in FIG. 4, image information A for the area ahead of the vehicle 1 enters a lens 21 of the image sensor 20 by way of the filter 17, the aperture 16b of the second mirror 16 and the aperture 15c of the first mirror 15, image information B for the area on the right of the vehicle 1 is reflected at the reflective surface 15a of the first mirror 15 and thereafter at the reflective surface 16a of the second mirror 16, and then enters the lens 21 of the image sensor 20 by way of the aperture 15c of the first mirror 15, and image information C for the area on the left of the vehicle 1 is reflected at the reflective surface 15b of the first mirror 15 and thereafter at the reflective surface 16a of the second mirror 16, and then enters the lens 21 of the image sensor 20 by way of the aperture 15c of the first mirror 15. The image information A directly enters the lens 21 without being reflected by the first and second mirrors 15 and 16, the quantity of light for the image information A entering the lens 21 is not reduced compared with the image information B and C. Therefore, the filter 12 is provided for reducing the quantity of light for the image information A to about the same level of those for the image information B and C entering the lens 21. Each of the image information A, B, C enters corresponding divided zone of the lens 21 of the image sensor 20, is converted to electric signals by a circuit on the circuit board 23 and is displayed on the corresponding divided zone of the screen 41 of the display unit 40.

Figure 6:
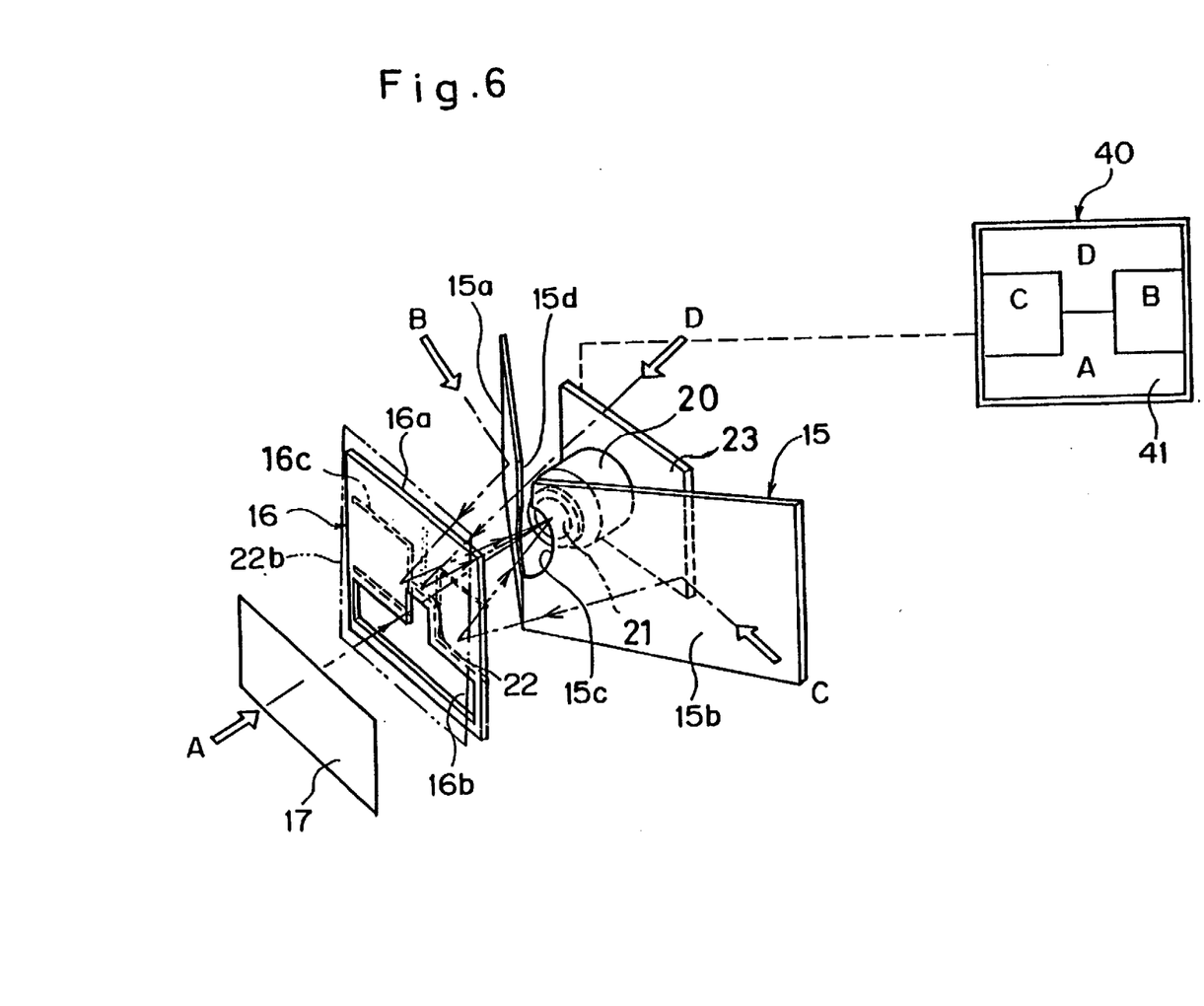
FIG. 6 is a view illustrating yet another embodiment of the device for checking lateral views at the front/rear ends of a vehicle.

FIG. 6 illustrates still another embodiment of the device for checking lateral views at the front/rear ends of a vehicle according to the present invention. The device for checking lateral views at the front/rear ends of a vehicle of FIG. 6 performs a function of obtaining image information D for the area backward of the vehicle 1 in addition to the functions that the device for checking lateral views at the front/rear ends of a vehicle of FIG. 4 performs. To obtain the image information D for the backward area of a vehicle, in the light path altering assembly 10 of FIG. 6, the first mirror 15 is removed at an upper center portion 15d thereof. Further, the reflective surface 16a of the second mirror 16 is so disposed as to slightly inclined upward with respect to a plane 22b which is perpendicular to the axial line 22 of the image sensor 20. Tape 11c is attached to the borders among the image information A, B, C and D so as to make clear the boundaries of these image information.

In the device for checking lateral views at the front/rear ends of a vehicle so configured as described above, the image information A for the area ahead of the vehicle 1 enters a lens 21 of the image sensor 20 by way of the filter 17, the aperture 16b of the second mirror 16 and the aperture 15c of the first mirror 15, the image information B for the area on the right of the vehicle 1 is reflected at the reflective surface 15a of the first mirror 15 and thereafter at the reflective surface 16a of the second mirror 16, and then enters the lens 21 of the image sensor 20 by way of the aperture 15c of the first mirror 15, the image information C for the area on the left of the vehicle 1 is reflected at the reflective surface 15b of the first mirror 15 and thereafter at the reflective surface 16a of the second mirror 16, and then enters the lens 21 of the image sensor 20 by way of the aperture 15c of the first mirror 15, and the image information D for the area backward of the vehicle 1 passes through the removed portion 15d of the first mirror 15, and is reflected at the reflective surface 16a of the second mirror 16, passes through the aperture 15c of the first mirror 15 and enters the lens 21 of the image sensor 20. The image information A directly enters the lens 21 without being reflected by the first and second mirrors 15 and 16, the quantity of light for the image information A entering the lens 21 is not reduced compared with the image information B and C. Therefore, the filter 12 is provided for reducing the quantity of light for the image information A to about the same level of those for the image information B and C entering the lens 21. Each of the image information A, B, C and D enters corresponding divided zone of the lens 21 of the image sensor 20, is converted to electric signals by a circuit on the circuit board 23 and is displayed on the corresponding divided zone of the screen 41 of the display unit 40.

Figure 7:
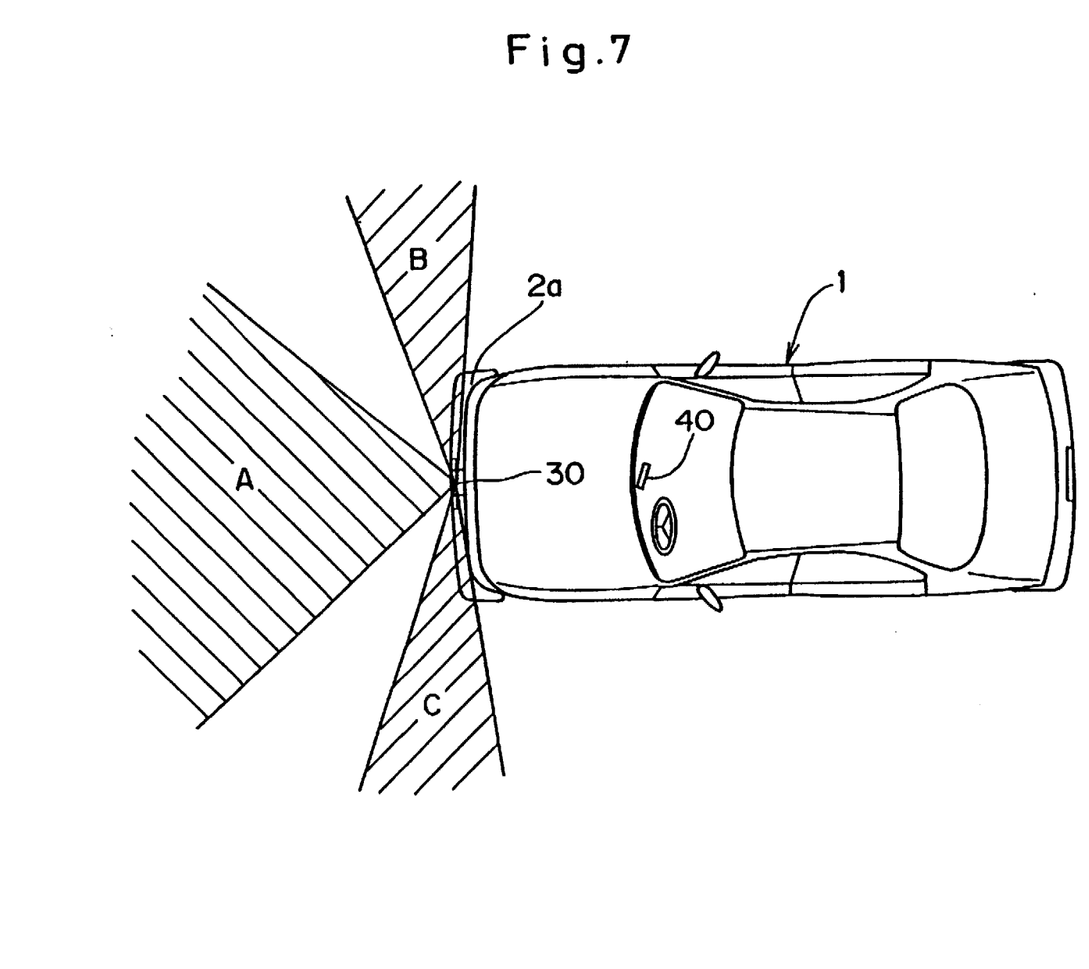
FIG. 7 illustrates a viewable range of the device for checking lateral views at the front/rear ends of a vehicle when the image pickup unit is disposed at the center of the front end of the vehicle.

In the embodiments of the device for checking lateral views at the front/rear ends of a vehicle as described above, the image pickup unit 30 is mounted at the front end or rear end of the vehicle 1. FIG. 7 illustrates that the image pickup unit 30 is mounted at the center of the front bumper 2a of the vehicle 1. In this case, the image information A, B, C for the areas ahead of and on the right and left of the vehicle 1 is displayed on the display unit 40 disposed in the room of the vehicle 1. Therefore, the situations on the right and left of the vehicle 1 and the situation ahead of the vehicle which is a visually dead angle from the driver's seat can be checked by the driver at the driver's seat when the vehicle 1 running in forward direction enters a main street from a small alley or from the carport of the house.

Figure 8:
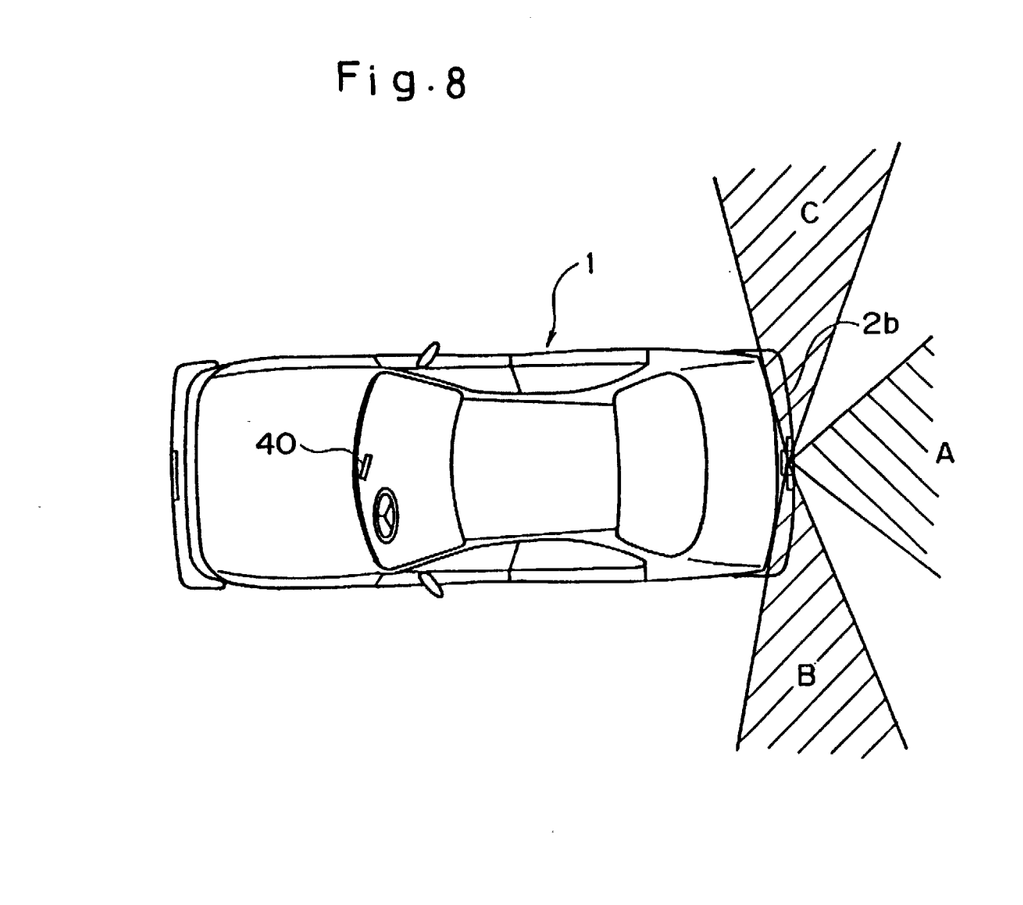
FIG. 8 illustrates a viewable range of the device for checking lateral views at the front/rear ends of a vehicle when the image pickup unit is disposed at the center of the rear end of the vehicle.

FIG. 8 illustrates that the image pickup unit 30 is mounted at the center of the rear bumper 2b of the vehicle 1. In this case, the image information A, B, C for the areas backward of and on the right and left of the vehicle 1 is displayed on the display unit 40 disposed in the room of the vehicle 1. Therefore, the situations on the right and left of the vehicle 1 and the situation backward of the vehicle which is a visually dead angle from the driver's seat can be checked by the driver at the driver's seat when the vehicle 1 running in forward direction enters a main street from a small alley or from the carport of the house.

Figure 9:
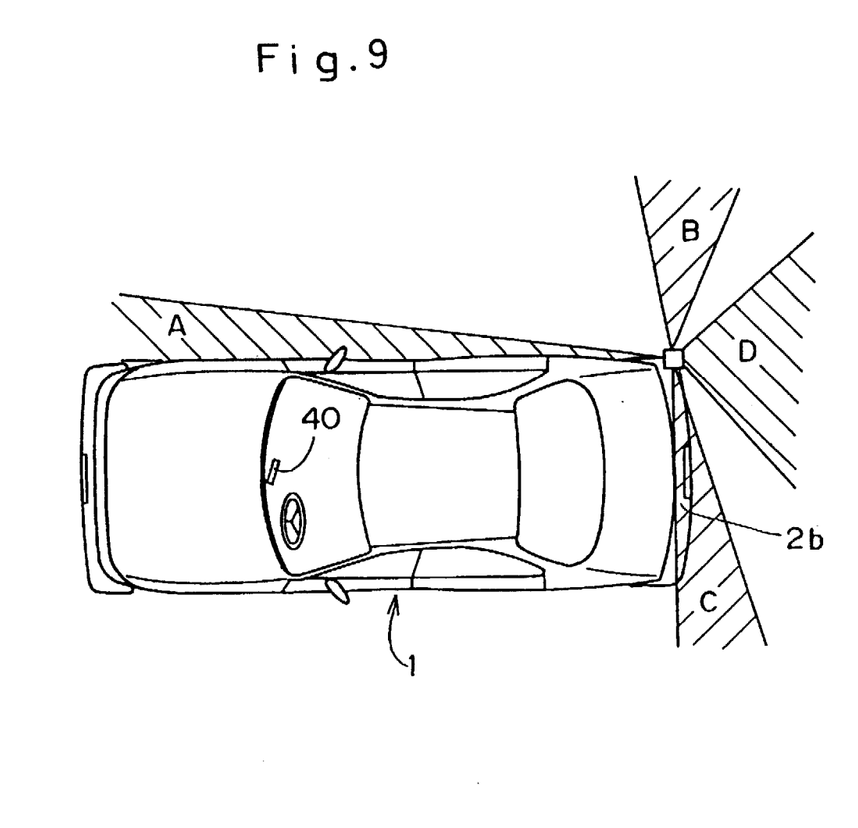
FIG. 9 illustrates a viewable range of the device for checking lateral views at the front/rear ends of a vehicle when the image pickup unit is disposed at the right rear corner of the vehicle.

FIG. 9 illustrates a left-side steering wheel type vehicle running in a country in a keep-to-the-left traffic system in which the image pickup unit 30 is mounted at the right end of the rear bumper 2b. On the display unit 40 disposed in the room of the vehicle, the image information A, D, B, C for the areas ahead, backward, on the right and on the left of the vehicle is displayed. When the vehicle enters the street from the carport of the house while running in the backward direction, the driver can check the traffic situation of the right and left of the street. When the vehicle of this type passes another car ahead while running in a country in a keep-to-the-left traffic system, the driver can check the situations in its front. When the vehicle runs backward, the driver can check the situation of the area backward of the vehicle which is visually dead angle from the driver.

As above-described, the device for checking lateral views at the front/rear ends of a vehicle according to the present invention enables the driver at the driver's seat to check the situations in lateral directions at the front end of the vehicle and the situation ahead of the vehicle or the situations in lateral directions at the rear end of the vehicle and the situation backward of the vehicle.

Therefore, when the vehicle enters the street from the carport of the house or when the vehicle enters the main street from an small alley, the situations of the street can be checked in advance, which makes the driving operation of the driver extremely easier.

What is claimed is:

1. A device for checking lateral views at front/rear ends of a vehicle comprising:

image pickup means having a light path altering assembly and an image sensor and disposed at a front or rear end of a vehicle, the light path altering assembly constructed and arranged for the image sensor to receive image information of areas on the right and left of the vehicle by way of the light path altering assembly and to receive directly image information of an area ahead of the image sensor through a gap in the light path altering assembly formed along an extension of an axial line of the image sensor; and display means provided in a room of the vehicle for displaying the image information taken into the image sensor.

2. The device as set forth in claim 1, wherein the image pickup means further comprises filter means disposed on a line connecting the image sensor and the gap or an extension thereof, for reducing the quantity of light of the image information taken into the image sensor through the gap to substantially the same quantity of light of the image information taken into the image sensor by way of the light path altering means.

3. The device as set forth in claim 1, wherein the image sensor comprises a charge coupled device.

4. The device as set forth in claim 1, wherein the light path altering means comprises mirror means which is disposed on both sides of a vertical plane containing an axial line of the image sensor with an angle of about 135 degrees relative to the vertical plane so as to lead the image information of areas on the right and left of the vehicle to the image sensor.

5. The device as set forth in claim 4, wherein the image pickup means further comprises filter means disposed on a line connecting the image sensor and the gap or an extension thereof, for reducing the quantity of light of the image information taken into the image sensor through the gap to substantially the same quantity of light of the image information taken into the image sensor by way of the light path altering means.

6. The device as set forth in claim 4, wherein the image sensor comprises a charge coupled device.

7. The device as set forth in claim 1, wherein the light path altering means comprises:
   first mirror means disposed on both sides of a vertical plane containing an axial line of the image sensor with a predetermined angle relative to the vertical plane; and
   second mirror means disposed in front of the image sensor with a reflective surface thereof being faced with the image sensor,
   whereby the image information of areas on the right and left of the vehicle is lead to the image sensor by being reflected at the first mirror means and then at the second mirror means.

8. The device as set forth in claim 7, wherein the first mirror means is disposed on both sides of the vertical plane with an angle of between 115 and 135 degrees relative to the vertical plane.

9. The device as set forth in claim 7, wherein the image sensor comprises a charge coupled device.

10. The device as set forth in claim 7, wherein the image pickup means further comprises filter means disposed on a line connecting the image sensor and the gap or an extension thereof, for reducing the quantity of light of the image information taken into the image sensor through the gap to substantially the same quantity of light of the image information taken into the image sensor by way of the light path altering means.

11. The device as set forth in claim 10, wherein the image sensor comprises a charge coupled device.

12. The device as set forth in claim 1, wherein the light path altering means comprises:
   first mirror means disposed on both sides of a vertical plane containing an axial line of the image sensor with a predetermined angle relative to the vertical plane; and
   second mirror means disposed in front of the image sensor with a reflective surface thereof being faced with the image sensor,
   whereby the image information of areas on the right and left of the vehicle is lead to the image sensor after being reflected at the first mirror means and then at the second mirror means, and wherein
   the second mirror means is disposed to be inclined with a predetermined angle relative to a plane perpendicular to the axial line of the image sensor,
   whereby image information of an area backward of the image sensor is taken into the image sensor after being reflected at the second mirror means.

13. The device as set forth in claim 12, wherein the image pickup means further comprises filter means disposed on a line connecting the image sensor and the gap or an extension thereof, for reducing the quantity of light of the image information taken into the image sensor through the gap to substantially the same quantity of light of the image information taken into the image sensor by way of the light path altering means.

14. The device as set forth in claim 12, wherein the image sensor comprises a charge coupled device.

* * * * *